United States Patent
Mostafa

(10) Patent No.: US 9,906,926 B2
(45) Date of Patent: *Feb. 27, 2018

(54) INFORMING RECIPIENT DEVICE OF MESSAGE CONTENT PROPERTIES

(71) Applicant: ZHIGU HOLDINGS LIMITED, George Town, Grand Cayman (KY)

(72) Inventor: Miraj Mostafa, Tampere (FI)

(73) Assignee: ZHIGU HOLDINGS LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,223

(22) Filed: Jun. 13, 2016

(65) Prior Publication Data
US 2016/0295382 A1    Oct. 6, 2016

Related U.S. Application Data

(63) Continuation of application No. 13/662,043, filed on Oct. 26, 2012, now Pat. No. 9,369,306, which is a continuation of application No. 11/666,580, filed as application No. PCT/FI2004/000646 on Nov. 2, 2004, now Pat. No. 8,321,954.

(51) Int. Cl.
| | |
|---|---|
| *H04L 29/06* | (2006.01) |
| *H04W 4/14* | (2009.01) |
| *H04L 12/58* | (2006.01) |
| *H04W 12/08* | (2009.01) |

(52) U.S. Cl.
CPC .............. *H04W 4/14* (2013.01); *H04L 51/24* (2013.01); *H04L 69/22* (2013.01); *H04W 12/08* (2013.01); *H04L 51/38* (2013.01); *H04L 2463/101* (2013.01)

(58) Field of Classification Search
CPC ........ H04W 4/14; H04W 12/08; H04L 69/22; H04L 12/587; H04L 51/24; H04L 2463/101; H04L 12/5895
See application file for complete search history.

(56) References Cited

U.S. PATENT DOCUMENTS

| | | | | |
|---|---|---|---|---|
| 5,761,415 A * | 6/1998 | Joseph | ................. | G06Q 10/107 379/93.24 |
| 6,160,477 A * | 12/2000 | Sandelman | .......... | F24F 11/0086 340/12.53 |
| 6,956,832 B1 * | 10/2005 | Muhonen | ................. | H04L 12/58 370/310 |
| 7,177,909 B2 * | 2/2007 | Stark | ....................... | G06F 21/31 709/206 |
| 7,181,538 B2 * | 2/2007 | Tam | ........................ | H04W 4/18 379/88.13 |
| 7,254,643 B1 * | 8/2007 | Peters, Jr. | ............ | H04L 29/1216 709/227 |
| 7,865,394 B1 * | 1/2011 | Calloway | .............. | G06Q 10/107 370/252 |
| 9,338,190 B2 * | 5/2016 | Eng | ......................... | H04L 45/00 |

(Continued)

*Primary Examiner* — Mahfuzur Rahman

(57) ABSTRACT

According to one aspect of the present invention, a content class of a data set for a message to be transmitted to the recipient device is defined. A network element transferring messages to the recipient device specifies at least one information element in a message to the recipient terminal such that the information element includes an indication of the content class. The message is transmitted to the recipient device.

4 Claims, 3 Drawing Sheets

(56) References Cited

U.S. PATENT DOCUMENTS

| | | | |
|---|---|---|---|
| 2002/0044634 A1* | 4/2002 | Rooke | H04L 12/585 379/93.01 |
| 2002/0169823 A1* | 11/2002 | Coulombe | H04L 29/06027 709/203 |
| 2003/0119552 A1* | 6/2003 | Laumen | H04L 51/24 455/557 |
| 2005/0128943 A1* | 6/2005 | Gibbs | H04L 43/00 370/229 |
| 2006/0101160 A1* | 5/2006 | Coulombe | H04L 29/06027 709/246 |
| 2006/0117040 A1* | 6/2006 | Begeja | G06F 17/30828 |
| 2007/0058681 A1* | 3/2007 | Bettis | H04L 12/583 370/493 |
| 2008/0134018 A1* | 6/2008 | Kembel | G06F 17/30899 715/234 |
| 2010/0191608 A1* | 7/2010 | Mikkelsen | G06Q 30/0601 705/26.1 |
| 2010/0255890 A1* | 10/2010 | Mikkelsen | G06Q 10/06 455/567 |
| 2011/0125851 A1* | 5/2011 | McErlean | H04L 12/5855 709/206 |

* cited by examiner

| Field Name | Field Value | Description |
|---|---|---|
| ... | .... | ... |
| X-Mms-Content-Class | Content-Class-value | Optional. Classifies the content of the MM to the smallest content class to which the message belongs. |
| X-Mms-DRM-Content | DRM-Content-value | Optional. Indicates if the MM contains any DRM-protected element. |

INFORMING RECIPIENT DEVICE OF MESSAGE CONTENT PROPERTIES

FIELD OF THE INVENTION

The present invention relates to informing a recipient device of message content properties.

BACKGROUND OF THE INVENTION

Short message services are very popular today. Besides text-based short messages, means are also required for transmitting multimedia data. A multimedia messaging service (MMS) is a service which has been developed for transferring messages with various content types, such as video, audio and images. The 3GPP (3$^{rd}$ Generation Partnership Project) specification TS 23.140 v. 6.7.0 "*Multimedia Messaging Service (MMS); Functional Description; Stage 2*", September 2004, describes the basic functions of the MMS.

A multimedia messaging service may be arranged in an environment comprising different network types. The 3GPP MMS environment may comprise 2G and 3G networks and provides all the necessary service elements for multimedia messaging, such as delivery, storage and notification functionality. An MMS relay/server is responsible for storage and handling of incoming and outgoing messages and for the transfer of messages between different messaging systems. An MMS user agent resides on a mobile terminal transmitting or receiving multimedia messages. The MMS user agent is an application layer function that provides users with the ability to view, compose and handle multimedia messages (MM).

Multiple content types may be transmitted by MMS. An MM describes the content type of the message, for instance "jpeg" in the case of an image in the jpeg format being transmitted. An originator user agent adds an identifier of a MIME (multi-purpose Internet mail extensions) content type of an MM to the MM PDU (packet data unit). The identifier of the MIME content type is transferred by an intermediate MMS relay/server to a recipient user agent.

The 3GPP MMS also supports content adaptation. A number of content classes is specified in an OMA (Open Mobile Alliance) specification "*MMS Conformance Document 1.2*", Candidate Version 27 Jul. 2004. The content classes illustrated in Table 1 define content categorizations. Each content class defines particular requirements which a user agent must support in order to support the content class. An identifier of one of the content classes may be included in an MM from an originator user agent if the content of the MM is in conformance with requirements of the content class. This content class identifier, as well as other content information, such as an indication of presence of DRM (Digital Rights Management) protection, may be provided by an originator MMS user agent to the MMS relay/server. The MMS relay/server may use this content class information for identifying whether an adaptation is necessary: On the basis of the recipient MMS user agent properties and the received content class the (recipient) MMS relay/server may define if an adaptation is required.

If a recipient terminal wishes to obtain details of the content of a received MM (besides the content type), it needs to perform analysis of the content, i.e. analyse the body part of the MM. This may be very complex process and requires time and processing resources.

BRIEF DESCRIPTION OF THE INVENTION

An object of the present invention is to provide an enhanced content property information solution. The objects of the invention are achieved by methods, network elements and mobile terminals which are characterized by what is stated in the independent claims. Some embodiments of the invention are disclosed in the dependent claims.

According to an aspect of the invention, a content class of a data set for a message to be transmitted to the recipient device is defined. A network element transferring messages to the recipient device specifies at least one information element in a message to the recipient terminal such that the information element comprises an indication of the content class. The message is transmitted to the recipient device.

According to another aspect of the invention, a network element transferring messages to the recipient device may define if a data set for a message to be transmitted to the recipient device comprises an element the usage of which is restricted. The network element specifies at least one information element in a message to the recipient terminal such that the information element comprises an indication of usage restricted content in response to the data set comprising one or more elements the usage of which is restricted. The message is then transmitted to the recipient device.

The term "data set" refers generally to any kind of set of information capable of being transmitted by messaging to the recipient, and may include multiple media types. The term "content class" refers generally to information associated with one or more requirements that the data set fulfils without being limited to content classes specified for the 3GPP MMS. It is also to be noted that the definition of a content class of a data set or definition of application of usage restriction in a data set is to be understood generally to refer to any kind of activity on the basis of which information of the content class or on the application of usage restriction can be obtained. Similarly, the specification of an information element comprising an indication of the content class or an information element comprising an indication of usage restricted content is to be understood generally to refer to any kind of activity producing this information for a message to be transmitted to the recipient device. For instance, this information may be indicated in a received message, and the information may be simply copied to the message to be transmitted.

An advantage of this aspect of the invention is that an indication of a content type and/or an indication of usage right controlled content may be delivered to a recipient terminal. The recipient terminal may, on the basis of the indication, easily detect the content class to which the received content belongs to and/or if the use of the content is restricted. This is important for devices with relatively small memory/processing resources, such as many mobile phones. Further, as less processing of a received message is required, less battery resources are consumed.

BRIEF DESCRIPTION OF THE DRAWINGS

In the following some aspects of the invention will be described in greater detail by means of some embodiments with reference to the accompanying drawings, in which.

DETAILED DESCRIPTION OF SOME EMBODIMENTS OF THE INVENTION

Some embodiments of the invention will be described in the following in a system supporting the 3GPP multimedia messaging service (MMS); it should, however, be noted that the application of the invention is not restricted to such systems.

Figures 1, 6:
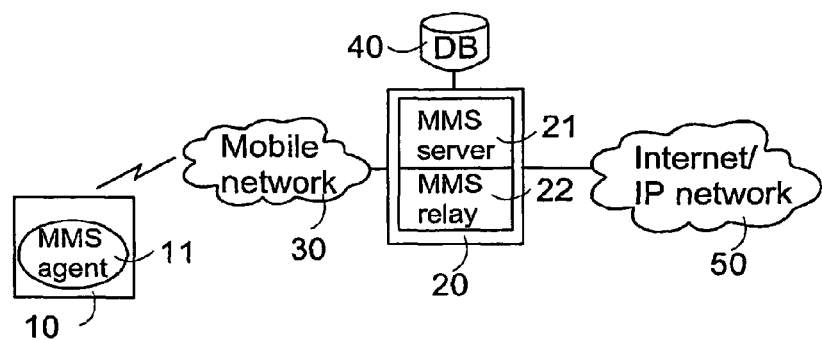
FIG. 1 is a block diagram illustrating a multimedia messaging system.
FIG. 6 is a table describing exemplary headers for multimedia messages.

FIG. 1 shows an example of architectural elements in an MMS environment. A mobile terminal 10 comprises an MMS user agent 11 taking care of MMS related functions in the user terminal 10. A mobile phone, a laptop computer equipped with a transceiver, or a PDA (Personal Digital Assistant) device could serve as the terminal 10. It is to be noted that the MMS agent 11 could reside in an external device connected to the terminal 10. The MMS agent 11 is arranged to retrieve multimedia messages by initiating MM delivery and to negotiate terminal capabilities with an MMS server/relay element 20. Thus, the MMS agent 11 needs to be capable of at least receiving multimedia messages. The MMS agent 11 may further be arranged to compose multimedia messages, submit multimedia messages to the MMS server/relay element 20, present multimedia messages, and present notifications of multimedia messages to the user, for instance. The terminal 10 comprises a transceiver for communicating with a mobile network 30. For instance, the mobile network 30 may be a network supporting GSM services, a network supporting GPRS (General Packet Radio Service) services, a third-generation mobile network, such as a network according to the network specifications of the 3GPP, or a network supporting a plurality of telecommunications techniques. In the case of the 3GPP compliant mobile terminal, the terminal 10 may also be referred to as a user equipment (UE) or a mobile station (MS).

A network element 20 comprising the MMS server 21 and MMS relay 22 functionality is connected to the mobile network 30, or in an alternative embodiment it is included in some network element of the mobile network 30. The MMS relay/server 21, 22 may be a single logical element or may be separated into MMS relay and MMS server elements, possibly residing in separate devices. The MMS relay/server element 20 provides the following functionalities: receiving and sending of multimedia messages, conversion of messages to multimedia message format (for instance from facsimile to MM), conversion of multimedia messages to other message formats, message content retrieval, multimedia message notification to the MMS user agent 11, generation of delivery reports, routing of multimedia messages and read-reply reports, address translation, temporary storage of multimedia messages, and digital rights management (DRM) functionalities. The MMS relay/server element 20 may provide additional functionalities such as generation of charging data records (CDR), negotiation of terminal capabilities, or media type/media format conversion on the basis of the capabilities of the recipient terminal 10. The MMS server/relay element 20 may be connected to other networks, such as the Internet 50 and other mobile networks 30. The MMS environment may also comprise specific data storages 40, for instance a message store for temporary storing of multimedia messages and a user database comprising user specific data. One such user database is a home location registry (HLR) of a 3GPP mobile system. The MMS server/relay element 20 may also be connected to other devices and functions, for instance to MMS value added services (VAS) applications. An IP network 50 may be used to communicate with roaming MMS user agents 11 or wired e-mail clients, for instance. Although not shown in FIG. 1, the MMS system may comprise an MMS proxy-relay for transferring multimedia messages. For more details on already specified MMS environment and MMS functions in the user agent 11 and the MMS server/relay element 20, reference is made to the 3GPP specification TS 23.140 v. 6.7.0 "*Multimedia Messaging Service (MMS); Functional Description; Stage 2*", September 2004, in particular Chapters 5-7.

The mobile terminal 10 and the MMS server/relay element 20 comprise memory, a transceiver for arranging data transfer, and a processing unit comprising one or more processors. Computer program codes executed in the processing units may be used for causing these devices 10, 20 to implement means for providing inventive functions relating to arranging utilization of content properties, some embodiments of the inventive functions being illustrated below in association with FIGS. 2 to 6. In one embodiment a modified MMS user agent 11 and a modified MMS server 21 and/or relay 22 perform at least some of the inventive functions illustrated below. The modifications may be implemented by specific program code portions in a software for implementing the MMS user agent 11 and MMS server 21 and/or relay 22. However, it is to be noted that the inventive functions may be performed by some other entity.

A chip unit or some other type of module for controlling the device 10 and/or 20 may, in one embodiment, cause this device 10 and/or 20 to perform the inventive functions. The module may form part of the device 10 and/or 20 and could be removable, i.e. it could be inserted into another unit or device. Computer program codes can be received via a network and/or be stored in memory means, for instance on a disk, a CD-ROM disk or other external memory means, where from they can be loaded into the memory of the data processing devices 100, 200. The computer program can also be loaded through a network by using a TCP/IP protocol stack, for instance. Hardware solutions or a combination of hardware and software solutions may also be used to implement the inventive functions.

Figure 2:
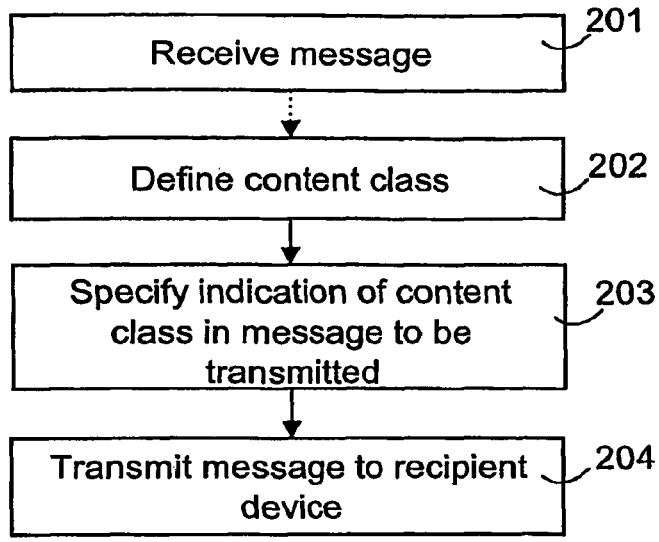
FIG. 2 is a flow diagram illustrating a method according to an embodiment of an aspect of the invention.

FIG. 2 illustrates a method according to an embodiment of the invention relating to utilization of content classes. The method illustrated in FIG. 2 may be applied in an intermediate element transferring messages to a recipient, in the present embodiment in a (recipient) MMS server/relay element 20 transmitting multimedia messages to a recipient MMS agent 11. A content class is associated with one or more requirements, which a data set (forming at least part of the content of a multimedia message) has to fulfil in order to belong to or to be associated with the content class. A predetermined group of content classes is specified in the system such that at least most of transferred multimedia messages would belong to some content class. In step 201 a message is received. The message may be a multimedia message or other type of message the contents of which are to be transferred as a multimedia message to the recipient terminal 10. The message may be received from an originator MMS user agent (11), another (originator) MMS server/relay element (20) if the originator of the message resides in an area of another MMS server/relay element 20, or another content provider that may be outside the MMS environment. A content class of the content of the message is defined in step 202. It is to be noted that, in an alternative embodiment the content class of only some of the content of the message received in step 201 could be defined in step 202. The content class may be defined in step 202 on the basis of a content class indication in the received message.

Thus, the MMS relay/server element 20 may be arranged to check an information element indicating the content class in order to define the content class in step 202. Alternatively, the content class is defined 202 on the basis of an analysis of the content or on the basis of a modification to the content. In one example the MMS server/relay element 20 may perform an adaptation of the content of the received message and specify an appropriate content class for the content as adapted.

An indication of the content class is specified in step 203 in a message to be transmitted to the recipient terminal 10. This step may be part of formation of the MMS PDU comprising the contents of the message as received in step 201. In one embodiment a specific header comprising the indication of the content class is added to the PDU in step 203. After the preparation of the message, the message may be transmitted to the recipient device, in the present embodiment to the terminal 10 comprising the MMS agent 11. It is to be noted that the transmission may require a specific request from the recipient terminal 10, for instance after a notification of the received message from the MMS server/relay element 20.

Figure 3:
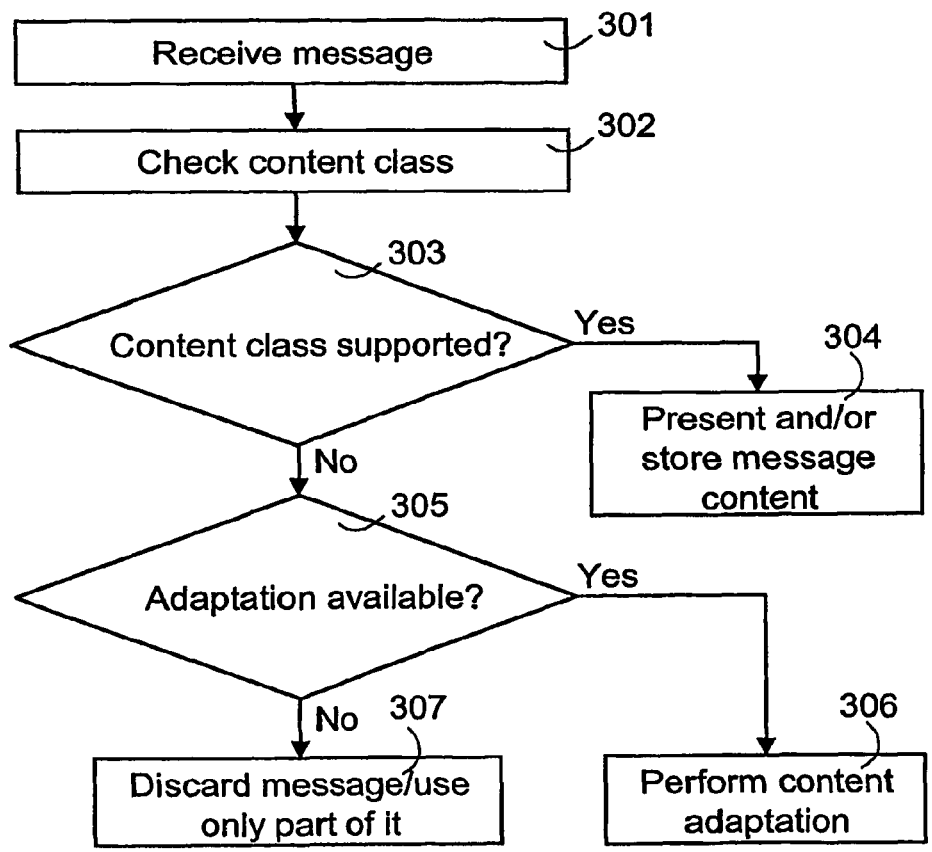
FIG. 3 is a flow diagram illustrating a method according to an embodiment of an aspect of the invention.

FIG. 3 illustrates an embodiment relating to the same aspect as FIG. 2, i.e. to the utilisation of content classes. The method illustrated in FIG. 3 may be applied in a recipient device, in the present embodiment in the terminal 10 comprising the MMS agent 11. In step 301 a multimedia message is received. A content class of the received multimedia message is checked 302. In one embodiment the content class is defined by checking the contents of a specific MMS header indicating at least one content class associated with the multimedia message.

The recipient device 10 may be arranged to adapt the processing of the message content in accordance with the content class defined in step 302. The processing is to be understood broadly to cover one or more further actions relating to the message content, for instance storing of the content, presenting the content, or modifying the content. Thus, the content class indicated in the message may have impact on further actions on the message content. In the embodiment of FIG. 3, the processing of the message content is adapted on the basis of a check for support of the content class.

In step 303 the terminal 10 checks if the content class is supported. In one embodiment this step 303 is performed by comparing the content class defined in step 302 to predetermined content classes specified as supported by the terminal 10. The predetermined supported content classes may have been specified on the basis of the properties of the terminal 10, for instance screen properties and supported applications in the terminal 10, and could be stored in a specific terminal capability file, for instance. If the content class of the received message is supported, the message may be further used 304 in the terminal 10 as appropriate. Typically, the content of the message is presented and stored.

In one embodiment, the presentation of a media object may be prepared (in step 304, for instance) on the basis of the detected content class, i.e. early processing may be invoked before presentation of the content on the basis of the detected content class. For instance, a video player is invoked for a message the content class of which indicates a content class for video, whereas for a message indicating a text content class no media player is required.

In another embodiment the terminal 10 is arranged to store the message content in accordance with the identified content class: there could be content class specific storage positions in the terminal 10. For instance, contents of a received MM with a content class for images are stored in a specific folder for images. The message content may also be further modified.

If the content class is not supported, in the present embodiment the terminal 10 is arranged to determine 305 if an adaptation of the content is available. The adaptation may be used to alter the content of the received message such that the content would be presentable in the recipient terminal 10. If no adaptation is available, the message content may be discarded or only some of the content is used. It is to be noted that in step 307 the message could be stored although it is not possible to present the contents of the message as such. If appropriate adaptation is available, content adaptation into a presentation format or a class supported by the recipient terminal 10 may be performed in step 306.

Figure 4:
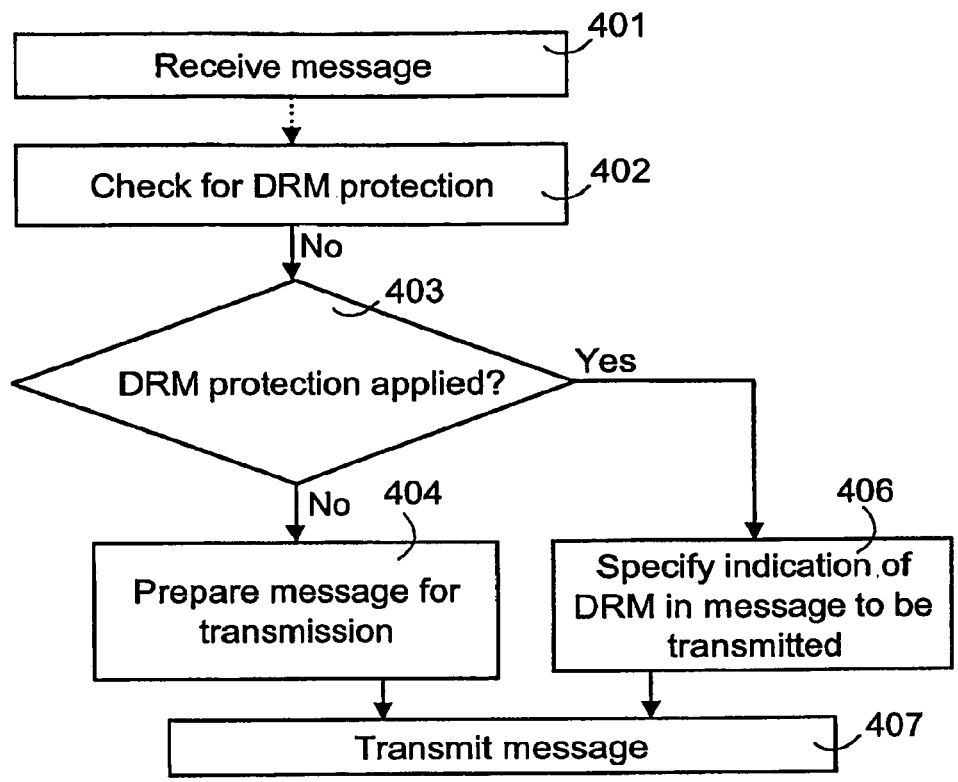
FIG. 4 is a flow diagram illustrating a method according to an embodiment of another aspect of the invention.
Figure 5:
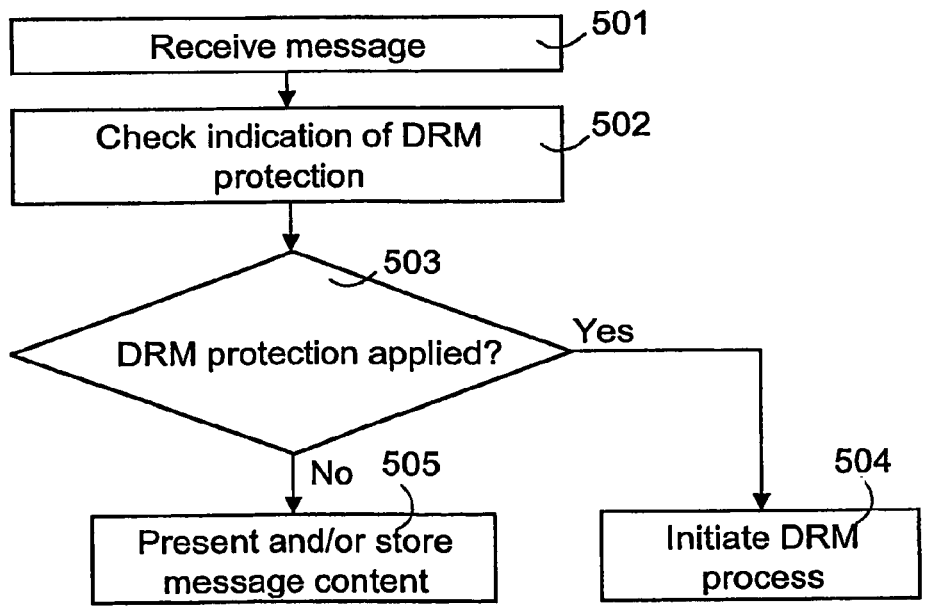
FIG. 5 is a flow diagram illustrating a method according to an embodiment of another aspect of the invention.

FIGS. 4 and 5 illustrate another aspect of the invention, namely the indication of DRM protection in a message to the recipient. FIG. 4 illustrates functions that can be applied in an intermediate device such as the MMS server/relay element 20. In step 401 a multimedia message or another type of message (to be transmitted as multimedia message to a recipient) is received. The content of the message may be checked in step 402 in order to define if DRM protection is applied for any portion of the message content. For this purpose a body part of the received message may be analysed in step 402. In an alternative embodiment a specific header or other type of information element in the received message indicating the presence of DRM protection is checked in step 402 in order to define if at least part of the message content is DRM protected. If DRM protection is applied on the basis of the check 402, 403, an indication of DRM protection is specified in step 406 in a multimedia message to be transmitted to the recipient terminal 10. In one embodiment, a specific header comprising an indication of DRM protection is added into an MMS PDU comprising the content of the received message. Alternatively, if DRM protection is not applied in the content of the received message, a multimedia message for the recipient may be prepared 404 without an indication of DRM protection. In an alternative embodiment the message is prepared in step 404 such that it specifically indicates that no DRM protection is applied in the message content. After steps 404 or 406 the message may be transmitted 407 to the recipient terminal 10.

FIG. 5 illustrates functions that can be applied in a recipient device, in the present embodiment in the terminal 10 comprising the MMS agent 11. In step 501 a multimedia message is received. The recipient terminal 10 is arranged to check in step 502 if the message comprises an indication of DRM protection. Similarly as described in association with FIG. 3 and step 302, there are alternative embodiments for arranging the indication of this content property to the recipient terminal 10. In one embodiment, a specific header of the multimedia message is checked in step 502.

On the basis of steps 502, 503, the terminal 10 may be arranged to adapt one or more further actions on the content or part thereof of the received message in response to the information element indicating data protection. If DRM protection is applied on the basis of check 502, 503, a DRM activity may be initiated in step 504. For instance, the MMS agent 11 may invoke a DRM client in the terminal 10 for handling the DRM protected content of the received message. The DRM client may then encode, decode, and/or store the DRM-protected content, for instance. For more details on DRM functions and available usage restrictions provided by these functions, a reference is made to OMA DRM specifications. Thus, the recipient terminal 10 may be arranged to adapt the further processing of at least some of the message content by initiating a DRM process. In one scenario the message comprises a locked (encrypted) media object such as a music video presentation, which can only be unlocked (decrypted) by an unlocking (decryption) key obtained by a licensing procedure with an external licensing server. The procedure for obtaining the license and the unlocking key may be initiated on the basis of the DRM protection indication in the received message.

Alternatively, if no DRM protection is applied, the message content may be used as appropriate without any specific DRM functions in step 505. Typically the message content is presented and stored.

In one embodiment the MMS server/relay element 20 is arranged to check if the received message (after step 201 and/or step 401) comprises an indication of the content class and/or the DRM protection. This checking may be performed by analysing the header portions of the received MMS submission PDU. If the message comprises such indication, the MMS server/relay element 20 may be arranged (in step 202 in the case of the embodiment of FIG. 2 or in step 404 or 406 of the embodiment of FIG. 4) to copy at least one header comprising such indication from the received submission message to the retrieval/delivery PDU to the recipient terminal 10. Thus, the MMS relay/server element 20 is not required to generate the information by itself, whereby the load on the MMS relay/server element 20 is not expected to increase. If there is no indication of DRM protection and/or content class, the MMS server/relay element 20 may be either arranged to analyze the content of the received PDU to determine this information on applied content class and/or DRM protection or omit the indication of content class and/or DRM protection in the retrieval/delivery PDU to be transmitted to the recipient terminal 10.

In a similar fashion as in the embodiment above, also the terminal 10 comprising the MMS user agent 11 may be arranged to perform a checking step for the indication of the content class and/or the application of DRM protection (in step 302/502, for instance). If no indication is available, the terminal 10 could proceed (instead of step 303/503) to analyse the content of the received message in order to identify the content class and/or the application of DRM protection.

In one embodiment an indication of the content class and/or the application of DRM protection is specified in an MMS header of a transmitted MM PDU. Thus the MMS server/relay element 20 is arranged to add at least one MMS header comprising the indication of the content class and/or the DRM protection. In an alternative embodiment the indication of the content class and/or the application of DRM protection is specified in a notification message informing the recipient terminal 10 on a received MM. Thus, the content of the received message and the indication may be transferred in separate messages. On the basis of the content class indication and/or indication on the application of DRM protection the recipient terminal 10 may, instead of the embodiments illustrated above in connection with FIGS. 3 and 4, determine whether to request the transmission of the message content from the MMS server/relay 20.

FIG. 6 describes exemplary new header fields for 3GPP MMS system. These new header fields may also be specified in OMA MMS specifications. The header field "X-Mms-Content-Class" may be used for indicating the content class value. The value of this header "X-Mms-Content-Class" could, depending on the applied classification, provide information about an applicable media type/format, maximum size, maximum resolution of image/video, applicable presentation mechanism, and/or an applicable DRM-method.

The header field "X-Mms-DRM-Content" may be used to indicate the presence of DRM content. This header field could simply have the value 'Yes' or 'No'. The headers are optional, as some messages may not belong to any content class, and some message may not contain any DRM-protected content or are not available for the MMS server/relay element 20. It should be noted that there are also many alternative ways for indicating the content class and/or the DRM protection. For instance, a single header could be used. The presence of DRM content could also be further specified, for instance by indicating content elements that are DRM protected.

In another embodiment the content class is pre-associated with more detailed information on the DRM protection method or type. Thus, on the basis of a detected more detailed information, the recipient terminal 10 may be arranged to adapt further DRM procedures in/after step 504 of FIG. 5. For instance, the content class may specify the use of prevention of forwarding (Forward Lock), whereby the forwarding of the content is prevented in the terminal 10. Other exemplary DRM protection methods, which could be indicated in the DRM header field of FIG. 6 or in other kind of DRM indication headers, are Combined Delivery and Separate Delivery. It is to be noted that the applicable usage restriction methods are not limited to the DRM methods but any kind of usage restriction may be indicated to the recipient terminal 10. For instance, time specific restrictions, user restrictions, user group restrictions, financial restrictions, device restrictions, or application restrictions could be indicated.

As already mentioned, a content class is associated with or specifies one or more requirements, which a data set (which is part of the content of a multimedia message or the message as a whole) fulfils. The requirements may be specified as appropriate to classify transferred data in order to support interoperability between devices. Thus transferred (payload) data sets with similar properties would be associated with same content class. Some exemplary requirement categories which may be applied and indicated in one embodiment in the header of FIG. 6 are: size of content, text format of the content, image format of content, bitmap format of the content, video format of the content, audio format of content, PIM (Personal Information Management) format of the content, DRM protection mode of the content, and presentation format of the content. For instance, a maximum size of ≤30 kB is a requirement for a basic image class. Thus, a message comprising an image cannot be more than 30 kB in order to be associated (for instance by the MMS server/relay element 20 in step 202) with the basic image class. Further, the recipient terminal 10 is aware of the requirements associated with or specified by different predetermined content classes. After identifying the content class, the terminal 10 may initiate appropriate further actions on the basis of the content class of the received message. For instance, if a message associated with the basic image class is received, the terminal 10 may determine if it has enough available memory space for storing the message. If not, the user may be notified and/or available memory space may be increased if possible, for instance.

In one embodiment at least some of the following content classes are utilized to classify the content: text, image-basic, image-rich, video-basic, video-rich, megapixel, content-basic, content-rich. However, the indication of content types is not limited to any specific content types. In one embodiment the properties specified in Chapter 7 of the OMA specification "*MMS Conformance Document* 1.2", Candidate Version 27 Jul. 2004 are utilized in the classes text, image-basic, image-rich, video-basic, and video-rich. Referring to the embodiment of FIG. 6, the header field "X-Mms-Content-Class" may thus have one of these values. For instance, predetermined specific binary values for each of these content classes may be applied, on the basis of which the MMS user agent 11 and the MMS relay/server functions 21, 22 define and identify the content classes of multimedia messages.

It should be noted that the embodiments described above could also be applied in any combination thereof. It will be obvious to a person skilled in the art that, as the technology advances, the inventive concept can be implemented in various ways. The invention and its embodiments are not limited to the examples described above but may vary within the scope of the claims.

The invention claimed is:

1. A server, comprising:
at least one processor;
a transceiver in communication with the at least one processor, wherein the transceiver sends and receives messages; and
memory in communication with the at least one processor, the memory including computer program code, the computer program code being configured to, with the at least one processor, cause the server, at least, to:
 check a message received from an originator for an indication of a content class, the message comprising a data set wherein the content class is associated with one or more requirements that a data set forming at least part of the content of the message has to fulfill in order to belong to or to be associated with the content class;
 store the content class of the message;
 analyze the stored content class to determine routing of the message; and
 adapt the data set in the message and define the content class of the data set on the basis of the data set that has been adapted.

2. The server of claim 1, wherein the memory further including computer program code that cause the server to:
define the content class of the data set on the basis of a content class indication in the received message from the originator.

3. A server, comprising:
at least one processor;
a transceiver in communication with the at least one processor, wherein the transceiver sends and receives messages; and
memory in communication with the at least one processor, the memory including computer program code, the computer program code being configured to, with the at least one processor, cause the server, at least, to:
 check a multimedia message received from an originator for an indication of a content class, wherein the content class classifies the content of the multimedia message to a predetermined content class to which the multimedia message belongs, wherein the predetermined supported content class is specified on the basis of the properties of a terminal;
 store the content class of the message; and
 analyze the stored content class to determine routing of the message; and
 adapt the data set in the message and define the content class of the data set on the basis of the data set that has been adapted.

4. The server of claim 3, wherein the memory further including computer program code that cause the server to:
define the content class of the data set on the basis of a content class indication in the received message from the originator.

* * * * *